United States Patent [19]

Miura

[11] Patent Number: 5,434,737
[45] Date of Patent: Jul. 18, 1995

[54] FLEXIBLE DISK ASSEMBLY AND A FLEXIBLE DISK DEVICE WITH A WORKING ENVIRONMENT DISPLAY FUNCTION

[75] Inventor: Okimi Miura, Machida, Japan

[73] Assignee: Matsushita Electric Industrial Co., Ltd., Osaka, Japan

[21] Appl. No.: 249,694

[22] Filed: May 26, 1994

Related U.S. Application Data

[63] Continuation of Ser. No. 760,399, Sep. 16, 1991, abandoned.

[30] Foreign Application Priority Data

| Sep. 28, 1990 | [JP] | Japan | 2-260937 |
| Oct. 4, 1990 | [JP] | Japan | 2-267683 |
| Oct. 4, 1990 | [JP] | Japan | 2-267686 |

[51] Int. Cl.⁶ ............... G11B 23/03; G11B 33/14
[52] U.S. Cl. .................. 360/133; 360/97.02; 360/97.04
[58] Field of Search .......... 360/97.01–97.04, 360/133, 137

[56] References Cited

U.S. PATENT DOCUMENTS

| 4,603,455 | 4/1985 | Woest et al. | 29/25.42 |
| 4,636,891 | 1/1987 | Barski | 360/97.02 |
| 4,814,924 | 3/1989 | Ozeki | 360/133 |
| 4,860,143 | 8/1989 | Van Blerk | 360/133 |
| 4,885,652 | 12/1989 | Leonard et al. | 360/97.02 |
| 4,942,364 | 7/1990 | Nishijima et al. | 324/696 |
| 5,030,260 | 7/1991 | Beck et al. | 360/97.02 |
| 5,050,434 | 9/1991 | Demisch | 73/29.05 |
| 5,075,807 | 12/1991 | Inoue et al. | 360/97.02 |
| 5,148,337 | 9/1992 | Cullen et al. | 360/97.04 |
| 5,182,742 | 1/1993 | Ohmori et al. | 369/77.2 |
| 5,224,216 | 6/1993 | Gordon et al. | 360/133 |

FOREIGN PATENT DOCUMENTS

| 57-205875 | 12/1982 | Japan | 360/97.03 |
| 60-143495 | 7/1985 | Japan | 360/133 |
| 63-291282 | 11/1988 | Japan | 360/133 |
| 2-193387 | 7/1990 | Japan | 360/133 |

*Primary Examiner*—A. J. Heinz
*Assistant Examiner*—Jefferson Evans
*Attorney, Agent, or Firm*—Stevens, Davis, Miller & Mosher

[57] ABSTRACT

A flexible disk assembly having a detector for detecting at least one of temperature and humidity to determine whether the working environment is in an adequate condition for use of the flexible disk assembly, which detector is incorporated in a case of the flexible disk assembly, and a flexible disk device comprising a detector for detecting at least either one of temperature and humidity, a determining unit for determining the adequacy or inadequacy of the working environment, and an annunciator for notifying the adequacy or inadequacy of the working environment. Preferably, the flexible disk device further comprises a controller for controlling a disk rotating function, a head drive function and a write/read function according to a determination output of the determining unit.

12 Claims, 9 Drawing Sheets

FLEXIBLE DISK ASSEMBLY AND A FLEXIBLE DISK DEVICE WITH A WORKING ENVIRONMENT DISPLAY FUNCTION

This application is a continuation of application Ser. No. 07/760,399, filed Sep. 16, 1991, now (abandoned).

BACKGROUND OF THE INVENTION

This invention relates to a flexible disk drive and a flexible disk assembly used as a recording medium for writing and reading data in a flexible disk device. It is important to use a flexible disk within specified temperature and humidity ranges to maintain its compatibility and not to cause a deterioration of the magnetic characteristics. Therefore, standards for a flexible disk assembly have been established both in Japan and other countries. Nevertheless, conventionally, when a flexible disk is set in a flexible disk device, writing or reading of data is performed regardless of the temperature and humidity of the surrounding environment.

A global standard for comparatibility of flexible disks is established by ISO (International Organization for Standardization), and other standards are based on this global standard, which include JIS (Japanese Industrial Standards) in Japan, ANSI (American National Standards Institute) in the U.S., and ECMA (European Computer Manufacturers Association) in Europe.

Flexible disk assemblies of 8-inch and 5.25-inch sizes have soft plastic jackets. The material of the jackets is normally a vinyl chloride-based resin. Therefore, when the temperature of the jacket surface exceeds about 53° C., there is a fear that the jacket will be deformed permanently. For 3.5-inch flexible disk assemblies, hard cases of ABS (acrylonitrile butadiene styrene copolymer) resin or the like are used, and therefore, the allowable temperature is relatively high. However, when a flexible disk assembly of this type is used in a flexible disk device, if a flexible disk in the assembly is subjected to stress and exposed to a temperature of higher than 60° C., the disk itself is likely to soften, because the disk is made chiefly of PET (polyethylene terephthalate). Thus, for those flexible disk assemblies the temperature upper limit is specified at 59° C. On the other hand, a magnetic sheet of the flexible disk is made of an about 75 μm-thick base material coated on both sides with a magnetic layer of several μm. So, the expansion and contraction coefficients of the magnetic sheet due to changes in temperature and humidity are governed by the coefficients of the base material. The ISO standard provides the thermal expansion coefficient and the humidity expansion coefficient of a flexible disk by the following formulas (1) and (2).

$$\alpha_T = (17 \pm 8) \times 10^{-6} \text{ mm/mm/°C.} \quad (1)$$

$$\alpha_H = (0 \sim 15) \times 10^{-6} \text{ mm/mm/\% RH} \quad (2)$$

The expansion and contraction of a flexible disk are large and may easily lead to malfunctioning by off tracking. The ISO standard specifies the upper limit of wet-bulb temperature at 29° C. (and 26.5° C.). The relationship between the allowable temperature and humidity for a flexible disk assembly is shown in FIG. 6. The hatched area in FIG. 6 indicates the allowable working environment of a flexible disk assembly. Therefore, it is difficult to exchange data outside the allowable environmental range.

However, when a conventional flexible disk assembly as mentioned above is used in a low-temperature region, such as in cold districts, or conversely, when it is used at high temperature in midsummer, the flexible disk assembly is often loaded in a flexible disk device to write or read data in an inadequate environment having a temperature and humidity exceeding the allowable ranges. Therefore, problems may occur, such as an abnormal operation of the device, a deterioration in the magnetic characteristics of the magnetic disk sheet, and a compatibility error in writing or reading data. Even if a flexible disk device or a system incorporating a flexible disk device is located in the user's office room and in an allowable working environment for the flexible disk assembly, but the temperature and humidity of the place where the flexible disk assembly has been stored or the temperature and humidity of the flexible disk assembly itself are not within the allowable ranges, a deterioration of the magnetic characteristics or a compatibility error as mentioned above will occur when the flexible disk assembly is loaded immediately after it is taken out of storage. Another problem is that it is difficult for the user to check if the flexible disk assembly is at allowable temperature and humidity for its use.

SUMMARY OF THE INVENTION

This invention has been made to solve the problems mentioned above, and has as its object to provide a flexible disk assembly which may wait to start operation until the flexible disk assembly is ensured to be in an adequate environment of temperature and humidity, so that the flexible disk assembly can be protected from data corruption, deterioration of the magnetic characteristics and a compatibility error in writing or reading data.

According to this invention, in order to achieve the above object, there is provided detecting means for detecting at least one of temperature and humidity.

The above-mentioned detecting means determines whether the working environment is adequate, gives an indication of the result through notifying means, and generates detection output signals for controlling various functions of the flexible disk device. And the detecting means may have a display function to indicate the adequacy or inadequacy of the working environment.

Therefore, according to this invention, before a flexible disk assembly is loaded into a flexible disk device, if at least one of the temperature and humidity in the vicinity of the magnetic sheet is in an inadequate environment out of the allowable range, the inadequacy is detected and displayed by the detecting means. This indication makes it possible for the user to stop loading the flexible disk assembly into the flexible disk device. When the assembly is loaded into the flexible disk device, if either one of the temperature and humidity in the vicinity of the magnetic sheet is out of the allowable range, the detecting means detects this inadequate environmental condition, issues a detection output signal to the flexible disk device or a flexible disk controller, thereby notifying the user to wait because of the inadequate environment, and controls the various functions of the flexible disk device to suspend their operation. Before a flexible disk assembly is loaded, if the detecting means detects that the working environment is adequate, the user may load the flexible disk assembly into the flexible disk device. Or, when a flexible disk cassette has been loaded into the flexible disk device, if it is determined that the working environment is adequate according to a detection output signal from the detecting means, under this condition, the operation of the respective functions of the flexible disk device can be started.

DESCRIPTION OF THE PREFERRED EMBODIMENTS

Preferred embodiments of the present invention will be described with reference to the accompanying drawings.

An outline of a conventional flexible disk cassette to be embodied with the present invention will first be described.

Figure 5A:
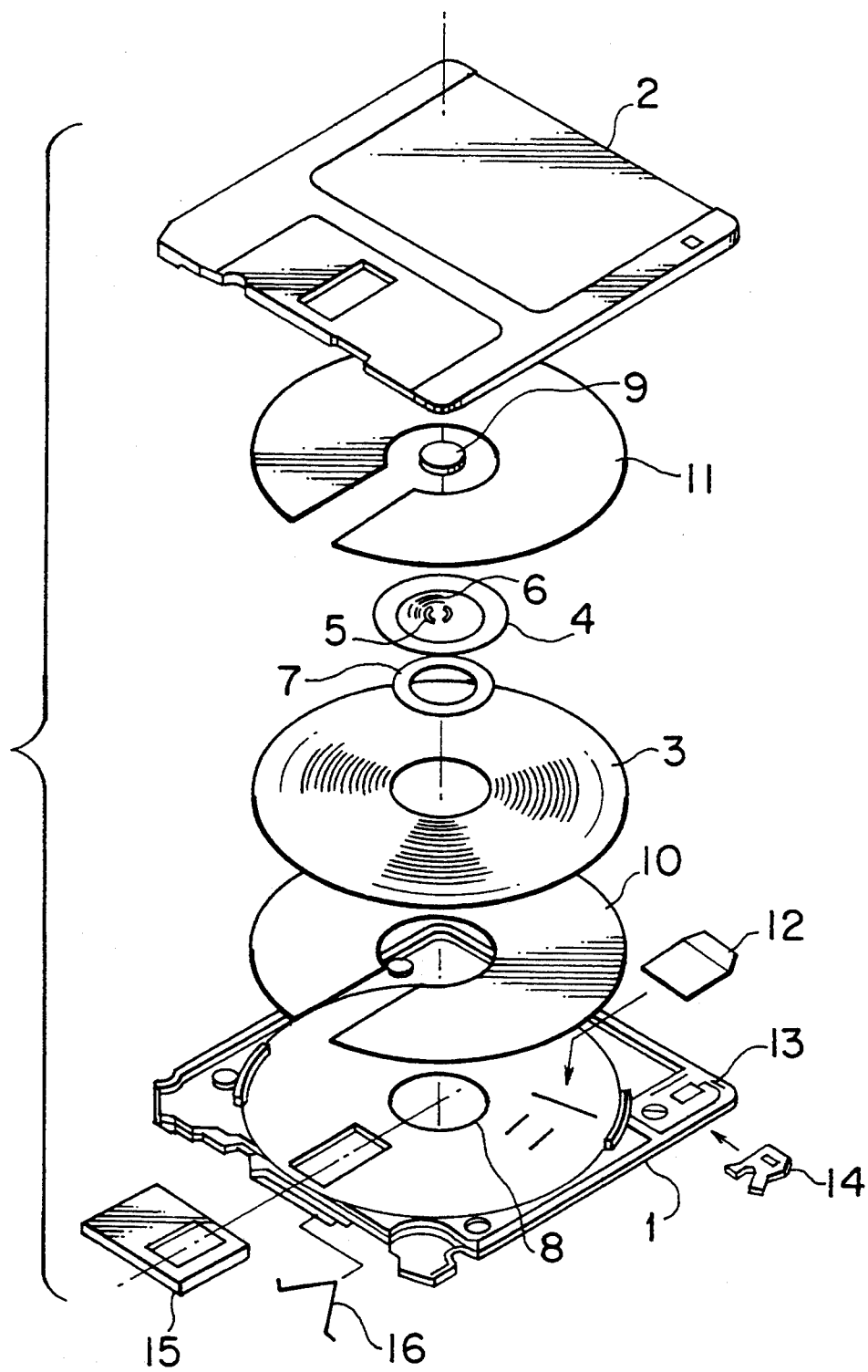
FIG. 5A is an exploded perspective view of a conventional flexible disk cassette.
Figure 5B:
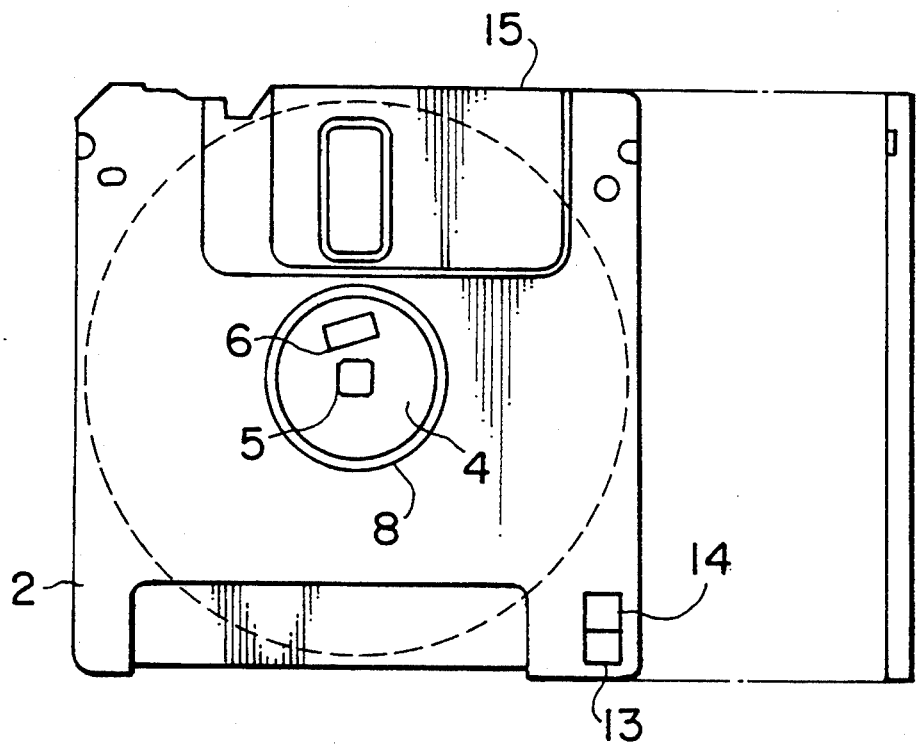
FIG. 5B is a bottom view of the assembled flexible disk cassette shown in FIG. 5A.
Figure 5C:
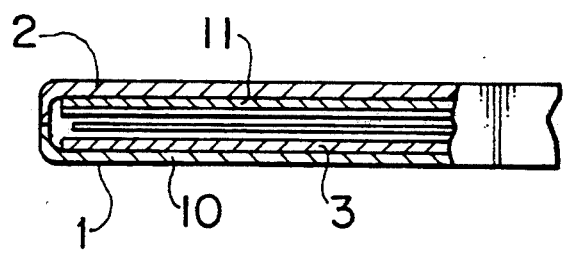
FIG. 5C is a partially enlarged sectional view of the same flexible disk cassette.
Figure 6:
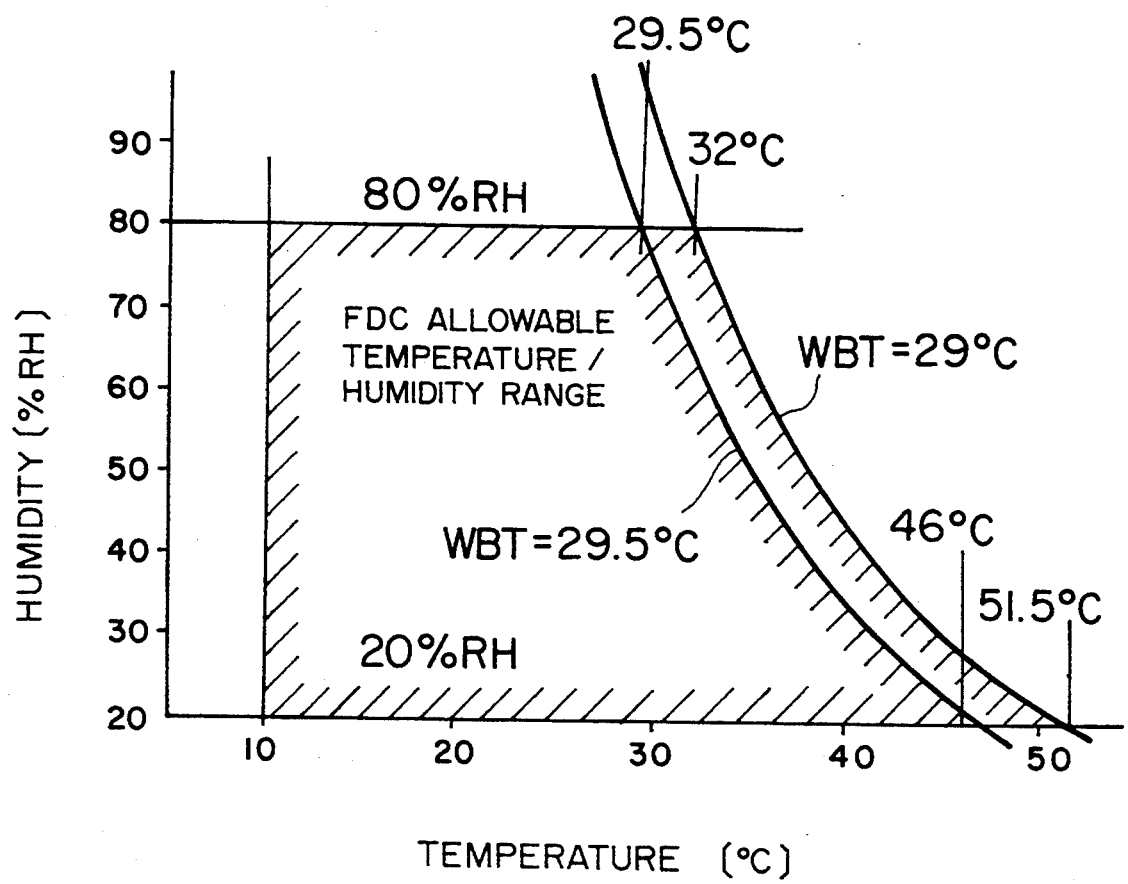
FIG. 6 is a diagram for explaining the preferred environment for flexible disk cassette measured with the wet bulb temperature (WBT) in the ISO standard.

FIGS. 5A to 5C show the conventional flexible disk cassette. FIG. 5A is an exploded perspective view, FIG. 5B is a bottom view with a side view in an assembled state, and FIG. 5C is a partially enlarged sectional view of the flexible disk cassette.

In FIGS. 5A to 5C, reference numerals 1 and 2 denote a lower case and an upper case respectively, which are put together in fixed state, 3 a magnetic sheet, and 4 a hub having a central hole 5 at the center and a drive hole 6 at the peripheral area. Numeral 7 denotes a bonding ring, which bonds the hub 4 to the central hole position of the magnetic sheet 3. The hub 4 is inserted into a hole 8 of the lower case 1. Numeral 9 denotes a center plate attached to an inner center position of the upper case 2 corresponding to the central hole 5 of the hub 4, and 10 and 11 denote liners, which are provided in contact with the inner surfaces of the lower case 1 and the upper case 2 respectively so as to hold the magnetic sheet 3 between them. Numeral 12 denotes a lifter disposed between the liner 10 and the lower case 1, the lifter being attached to the lower case 1, 13 a write inhibit hole, 14 a write protector supported on the inner surface of the lower case 1 in a manner capable of opening or closing the write inhibit hole 13. Numeral 15 denotes a shutter supported slidably straddling the lower case 1 and the upper case 2, 16 a spring located between the lower case 1 (or the upper case 2) and the shutter 13 and constantly pressuring the shutter 15 in the closing direction.

Figure 1A:
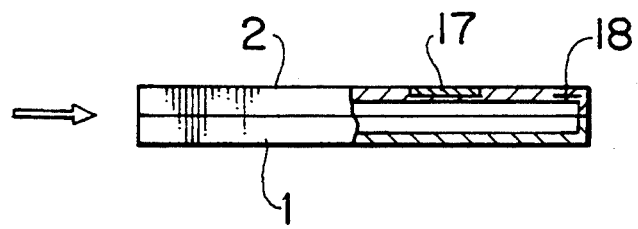
FIG. 1A is a sectional view of a case of an embodiment of the flexible disk assembly according to the present invention.
Figure 1B:
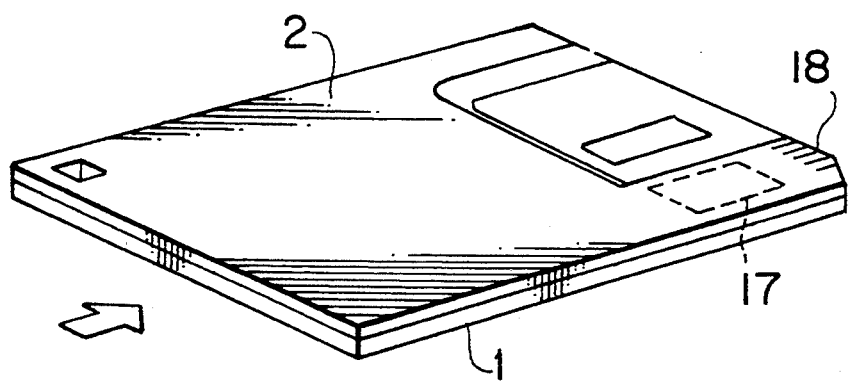
FIG. 1B is a schematic perspective view of the case shown in FIG. 1A.

FIGS. 1A and 1B show an embodiment of the flexible disk assembly or cassette of the present invention. FIG. 1A is a sectional view of the case of the cassette, and FIG. 1B is a schematic perspective view of the case.

As shown in FIGS. 1A and 1B, a detecting unit 17 for temperature or humidity and a contact terminal section 18 for sending an output signal of a detection (and discrimination) result and for receiving power supply, etc. are buried in a corner portion of the upper case 2, for example, in the construction shown in FIGS. 5A to 5C.

Figure 2:
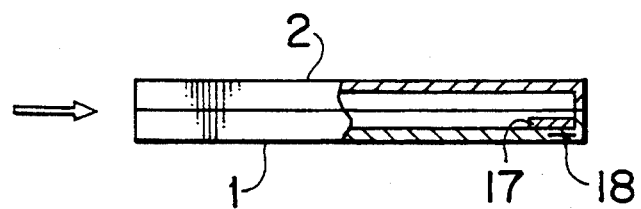
FIG. 2 is a sectional view of a case showing another arrangement of the detecting unit and the contact terminal portion in the flexible disk assembly according to the present invention.

FIG. 2 is a sectional view of another arrangement of the detecting unit and the contact terminal section in the cassette according to the present invention.

In the arrangement, as shown in FIG. 2, in the above-mentioned construction indicated in FIGS. 5A to 5C, the detecting unit 17 for temperature or humidity is provided in one united body in the inside of a corner portion of the lower case 1, and also, the contact terminal section 18 is buried in the same case 1.

Figure 3A:
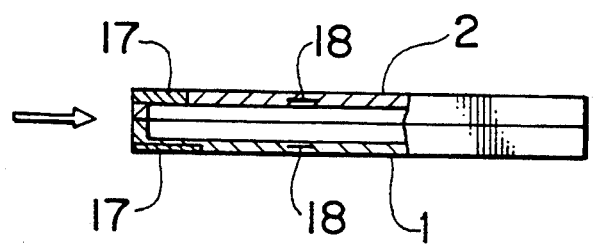
FIG. 3A is a sectional view of the case showing still another arrangement of the detecting unit and the contact terminal portion in the flexible disk assembly according to the present invention.
Figure 3B:
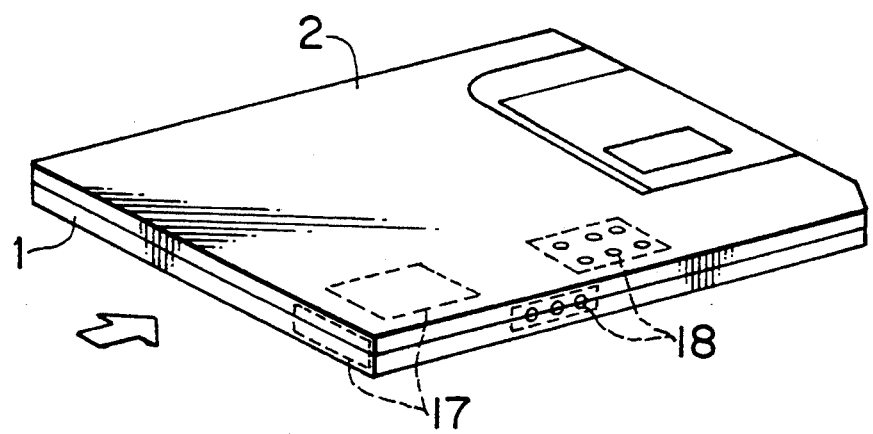
FIG. 3B is a schematic perspective view of the case shown in FIG. 3A.

FIGS. 3A and 3B show a still another arrangement of the detecting unit and the contact terminal section in the flexible disk according to the present invention. FIG. 3A is a sectional view of the case, and FIG. 3B is a schematic perspective view of the case.

In this embodiment, as shown in FIGS. 3A and 3B, in the construction indicated in FIGS. 5A to 5C, the detecting unit 17 for temperature or humidity and the contact terminal section 18 are buried in a corner portion and an intermediate portion respectively of the upper case 2 or the lower case 1 to the contrary of the forgoing arrangement. The detecting unit 17 and the contact terminals 18 may be buried straddling side and edge surfaces of the upper case 2 and the lower case 1. In another arrangement, detecting units 17 both for temperature and humidity and their contact terminals 18 are buried there.

A temperature detecting unit may be a thermistor or a thermocouple. The thermistor (or a thermally sensitive resistor) used in the detecting unit is a semiconductor made by sintering an oxide of manganese, nickel or cobalt to a 0.5 mm square chip. As the temperature rises, the electric resistance of the thermistor decrease, so that a change in the voltage or current is used as a signal output for temperature detection (and discrimination). In the thermocouple, two wires of different metals are joined at their ends, and a thermoelectromotive force resulting from a temperature difference between the two junctions is used as a signal output.

Referring to the exploded perspective view in FIG. 4, description will be made of an illustrative example of the humidity detecting (and discriminating) unit.

Figure 4:
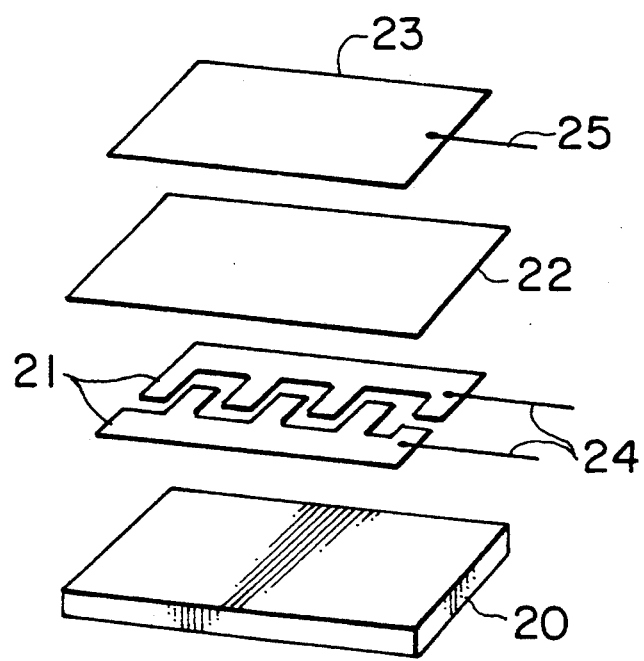
FIG. 4 is an exploded perspective view showing an illustrative example of moisture detecting unit used in the embodiments of the present invention.

As shown in FIG. 4, a couple of lower electrodes 21 (indicated by hatching) consisting of a metal is vapor-deposited to form a separated shape on a substrate 20 of glass or the like, a moisture-sensitive polymeric thin film 22 such as cellulose acetate is deposited on the lower electrodes 21, then an upper electrode 23 (indicated by hatching) consisting of a metal is vapor-deposited on the polymeric thin film 22, so that a circuit having two capacitors connected each other in series is thus formed with lead wires 24 and 25 connected to the electrodes 21 and 23, respectively. When the polymeric thin film 22 absorbs moisture, the dielectric constant varies, so that according to a change in the electrostatic capacity of the capacitor, the humidity of the flexible disk assembly can be detected.

The operation of the arrangement thus arranged will be described in the following.

A flexible disk cassette (hereafter referred to as FD) is mounted on a disk rotating function unit of a flexible disk device (hereafter referred to as FDD). Under this condition, the detecting means 17 detects the temperature and/or humidity of the FD itself and generates an output signal representing the temperature/humidity condition of the FD. Based on the detection output signal, the determining unit of the FDD determines whether the FD is in an allowable working environment or an inadequate working environment. If the FD is in an inadequate working environment of temperature or humidity, an FDD function control unit turns on an FDD working environment display function unit to notify the user of the inadequate working environment for the FD and to tell him not to proceed with operation with the FD. Also, the FDD function control unit sends a signal to a flexible disk controller (hereafter referred to as FDC) to inhibit the FDC from transmitting operation commands to the FDD. Therefore, the disk rotating function unit, a head drive unit and a write/read function unit in the FDD do not operate. Or, the function control unit in the FDD may directly control the above-mentioned functions not to operate. Thereby, it is possible to prevent the FD from being used in an inadequate working environment. The above-mentioned detection (discrimination) output signal may be applied to control adequate devices for changing the ambient condition of the FD into an allowable working environment prior to an operation of the FDD. More specifically, when the FD is exposed to high temperature or high humidity, a cooling apparatus may be driven. Conversely, if the FD is exposed to a low temperature, a heating apparatus may be driven. In this manner, the above-mentioned signal can be fed back to bring the FD into an allowable working environment as soon as possible.

On the other hand, when the determining unit of the FDD determines, based on a detection output signal of the detecting unit, that the working environment is in an adequate condition at the beginning or after some time passing, the function control unit of the FDD turns off a working environment display function unit to thereby notify the user that the working environment is in an adequate condition (it is also possible to turn on a lamp of other color than the color which notifies an inadequate working environment). At the same time, the function control unit sends a signal to the FDC to cause the FDC to transmit operation commands to the FDD directing the above-mentioned function units to operate. Or the function control unit directly controls operation of the function units.

Another example of the detecting unit 17 is made of a thermo-label having a display function. Being made of material which changes its color as the temperature changes, the thermo-label can indicate whether an FD can be used or not at the current temperature. If the same material is mixed in either one or both of the lower case 1 and the upper case 2 of the FD, it is possible to show whether the FD is usable or to indicate a temperature value by the color in an optional pattern or the color of the whole FD case.

If detecting unit 17 having such a display function is used in an FD, when the display function unit indicates an inadequate working environment before mounting the FD on the disk rotating function unit of the FDD, it is possible to stop loading the FD on the disk rotating function unit and thereby to prevent the FD from being used in an inadequate working environment. If the working environment is determined to be in an adequate condition according to a signal from the detecting means 17 when the FD is mounted on the disk rotating function unit of the FDD, the FD is mounted on the disk rotating function unit of the FDD, and the respective functions of the FDD are controlled so as to operate.

As has been described, according to the present invention, when an FD is loaded, if at least one of the temperature and humidity in the vicinity of the magnetic sheet is out of the allowable range and corresponds to a specified inadequate environment for the FD, this is detected by the detecting unit and is displayed to notify the user to stop loading the FD. Or, when an FD has been loaded in the flexible disk device, if at least one of the temperature and humidity in the vicinity of the magnetic sheet is out of the allowable range and corresponds to a specified inadequate environment for the FD, the detecting means detects the inadequacy and sends a detection signal to the flexible disk device or the flexible disk controller, which notifies the user of the inadequate working environment, telling him not to use the FD but to wait, and controls the functions of the FDD to keep them stationary. When an FD is loaded in the flexible disk device, if the detecting unit detects that the working environment is in an adequate condition, the FD is loaded subsequently into the flexible disk device. Or, when an FD has been loaded into the flexible disk device, if the working environment is determined to be in an adequate condition according to a detection output signal from the detecting unit, then under this condition, the operation of the respective functions of the flexible disk device can be started. In the manner described, it is possible to prevent the use of the flexible disk in an inadequate working environment. Therefore, data in the flexible disk can be protected, the magnetic characteristics of the disk can be prevented from deteriorating, and a compatibility error in writing or reading data can be eliminated in occurrence.

Another embodiment of the present invention will be described with reference to the accompanying drawings.

Figure 7:
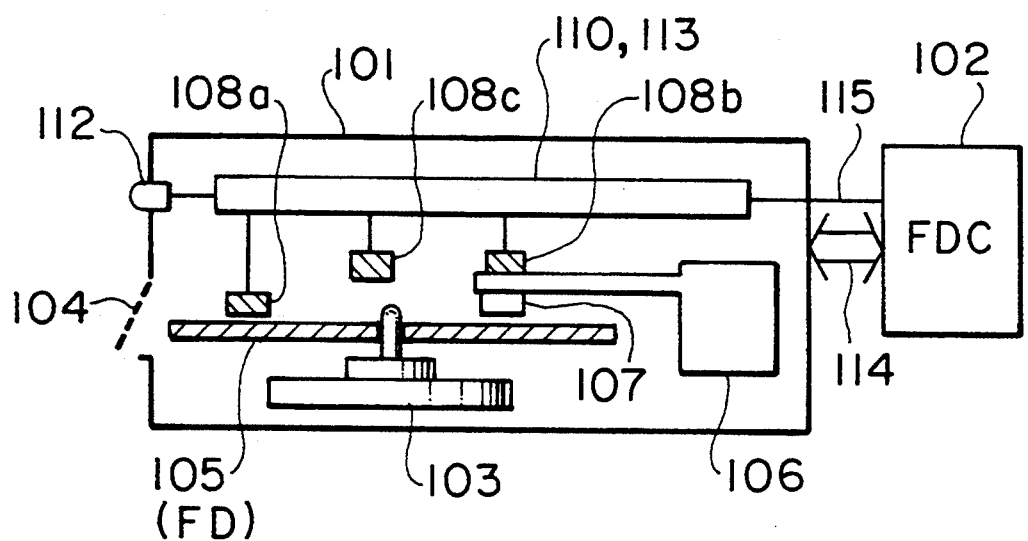
FIG. 7 is a schematic construction diagram of another embodiment of the flexible disk device of the present invention.
Figure 8:
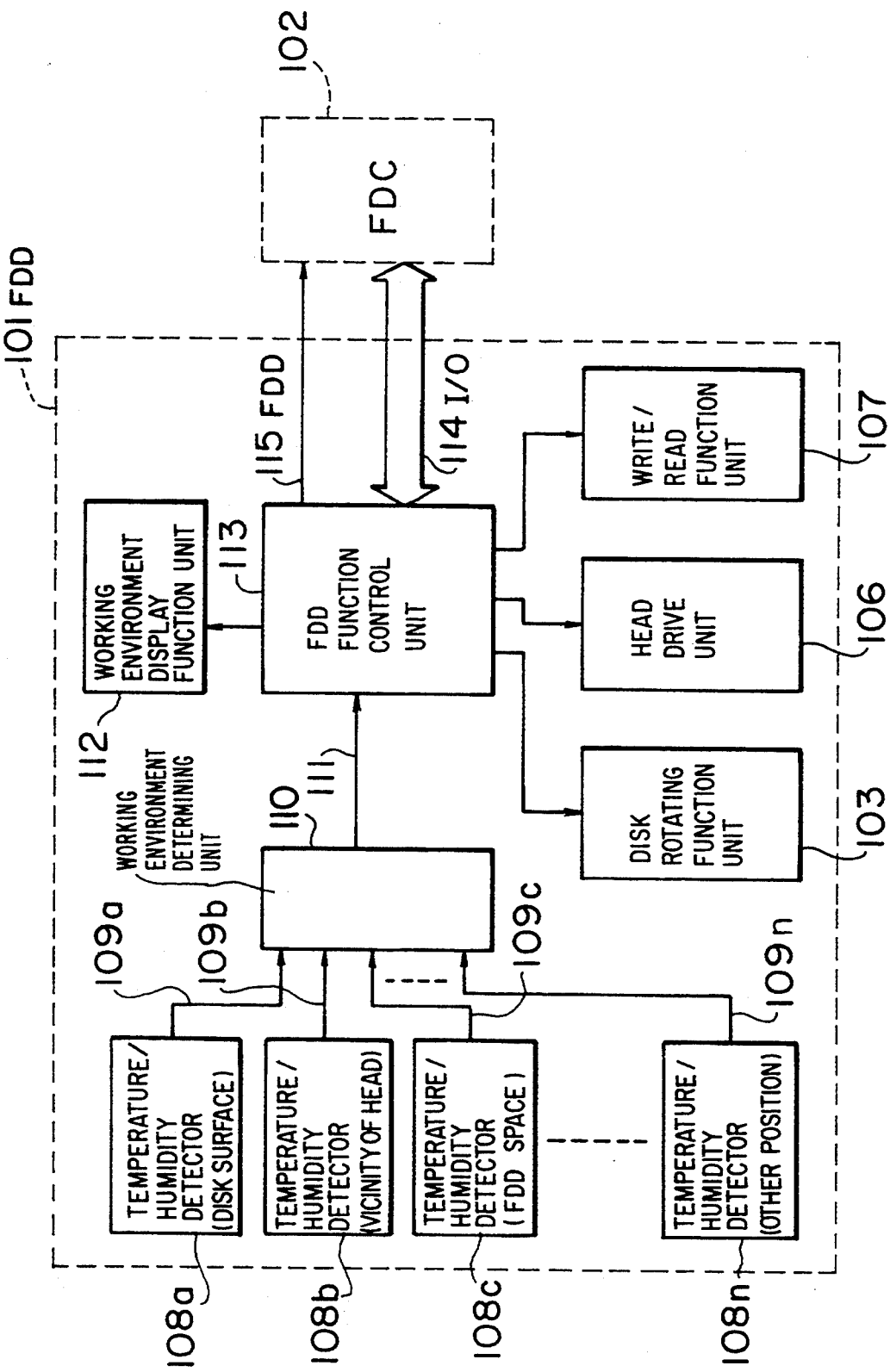
FIG. 8 is a schematic block diagram of the flexible disk device shown in FIG. 8.

FIGS. 7 and 8 show a flexible disk device in a second embodiment of the present invention. FIG. 7 is a schematic construction diagram, and FIG. 8 is a schematic block diagram of the device.

In FIGS. 7 and 8, reference numeral 101 denotes a flexible disk device (hereafter referred to as FDD), and 102 denotes a flexible disk controller (hereafter referred to as FDC) to control the drive of the FDD 101. In the FDD 101, numeral 103 denotes a disk rotating function unit for accepting and rotating a flexible disk cassette (hereafter referred to as FD) 105, which is a recording medium inserted through a slot 104. Reference numeral 106 denotes a head drive unit for moving a head to a position where the head writes data on and reads data from the FD 105, 107 denotes a write/read function unit having the head, and 108a, 108b, 108c . . . and 108n denote temperature/humidity detectors arranged at desired positions in the FDD 101. For example, the temperature/humidity detector 108a is located close to the surface of the FD 105, the temperature/humidity detector 108b is located in the vicinity of the head, the temperature/humidity detector 108c is located in the inner center position of the FDD 101 and so on, and the temperature/humidity detectors 108a to 108n generate detection output signals 109a, 109b, 109c, . . . and 109n, respectively. Numeral 110 denotes a working environment determining unit which, according to detection output signals 109a, 109b, 109c . . . and 109n from the temperature/humidity detectors 108a, 108b, 108c . . . and 108n, determines whether the working environment is in an adequate condition or in an inadequate condition, and generates a determination output signal 111. Numeral 112 denotes a display function unit, comprising an LED (light emitting diode), for displaying a condition of the working environment. Numeral 113 denotes FDD function control unit which controls the disk rotating function unit 103, the head drive unit 106, and the write/read function unit 107, and controls exchange of input/output signals with the FDC 102, that is, performs input/output interface control with the FDC 102. According to the determination output signal 111, the FDD function control unit turns the working environment display function unit 112 on and off, and sends an FDD environmental condition signal 115.

The operation of the FDD constructed as mentioned above will next be described.

When the FDD 101 is used, the environmental temperature/humidity conditions are detected at various positions, including the surface of the FD 105 mounted on the disk rotating function unit 103, the vicinity of the head, and the inner center position of the FDD 101. The working environment determining unit 110 collects detection output signals 109a, 109b, 109c . . . and 109n, determines whether the FDD 101 is in an allowable working environment or in an inadequate working environment, and outputs a determination output signal to the FDD function control unit 113. At this time, if any one of the temperature/humidity detectors 108a, 108b, 108c . . . and 108n detects that the working environment is inadequate, the working environment determining unit 110 determines the working environment to be inadequate, and the FDD function control unit 113, responding to this determination output signal, turns on an LED of the working environment display function unit 112, thereby notifying the user of the inadequate working environment and telling him not to use the FD but to wait. At the same time, the FDD function control unit 113 sends an FDD environmental condition signal 115 to FDC 102, and turns off the "READY" signal, for example. Therefore, the FDC102 may avoid transmitting operation commands to the FDD 101, so that it is possible to prevent the FDD 101 from operating in an inadequate working environment. In addition, the above-mentioned environmental condition signal can be used to control arbitrary devices, thereby changing the surrounding environment condition of the FD 105 to an allowable working environment. To be more specific, the environmental condition signal 115 can be fed back to promptly secure an allowable working environment for the FDD 101 and the FD 105 by driving a cooling apparatus when the temperature or humidity is too high or by driving a heating apparatus or an air blower when the temperature is too low. It ought to be noted that the whole environment where an installed system with the FDD 101 is placed can be controlled so as to be in an allowable environmental condition.

Meanwhile, if, according to a detection result by the temperature/humidity detectors 108a, 108b, 108c . . . and 108n, the working environment determining unit 110 determines that the environmental temperature and humidity are within the allowable ranges at the beginning or after some time passing, the FDD function control unit 113 turns off the working environment display function unit 112, thereby notifying the user that the environmental conditions are within the allowable ranges (or by turning on another lamp of different color from the color of the lamp indicating an inadequate environment). Then, the "READY" signal supplied to FDC 102 is switched to "ON" state, so that the FDD 101 is made available.

As has been described above, according to the present invention, at least either one of the temperature and humidity of the surface, for example, of the flexible disk cassette is detected by the detecting unit, and the determining means determines whether the working environment is in the adequate condition or in the inadequate condition on the basis of output of detection result. If a determination is that the working environment is inadequate, the inadequacy is notified by the notifying means to the user and the flexible disk controller is inhibited from transmitting operation commands to the FDD function control unit. As an FD may be prevented from operating in an inadequate working environment, the reliability and durability of a flexible disk assembly improves by avoiding malfunctions. Furthermore, the flexible disk assembly can be prevented from an excess expansion and contraction, and stored data can be protected and the magnetic characteristics of the disk can be prevented from deteriorating.

Still another embodiment of the present invention will be described with reference to the accompanying drawings.

Figure 9:
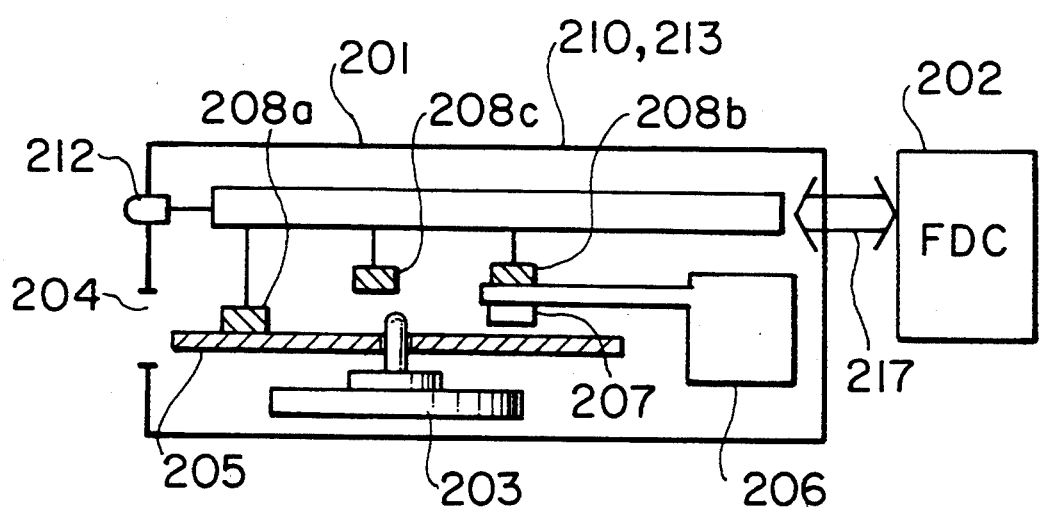
FIG. 9 is a schematic construction diagram of still another embodiment of the flexible disk device of the present invention.
Figure 10:
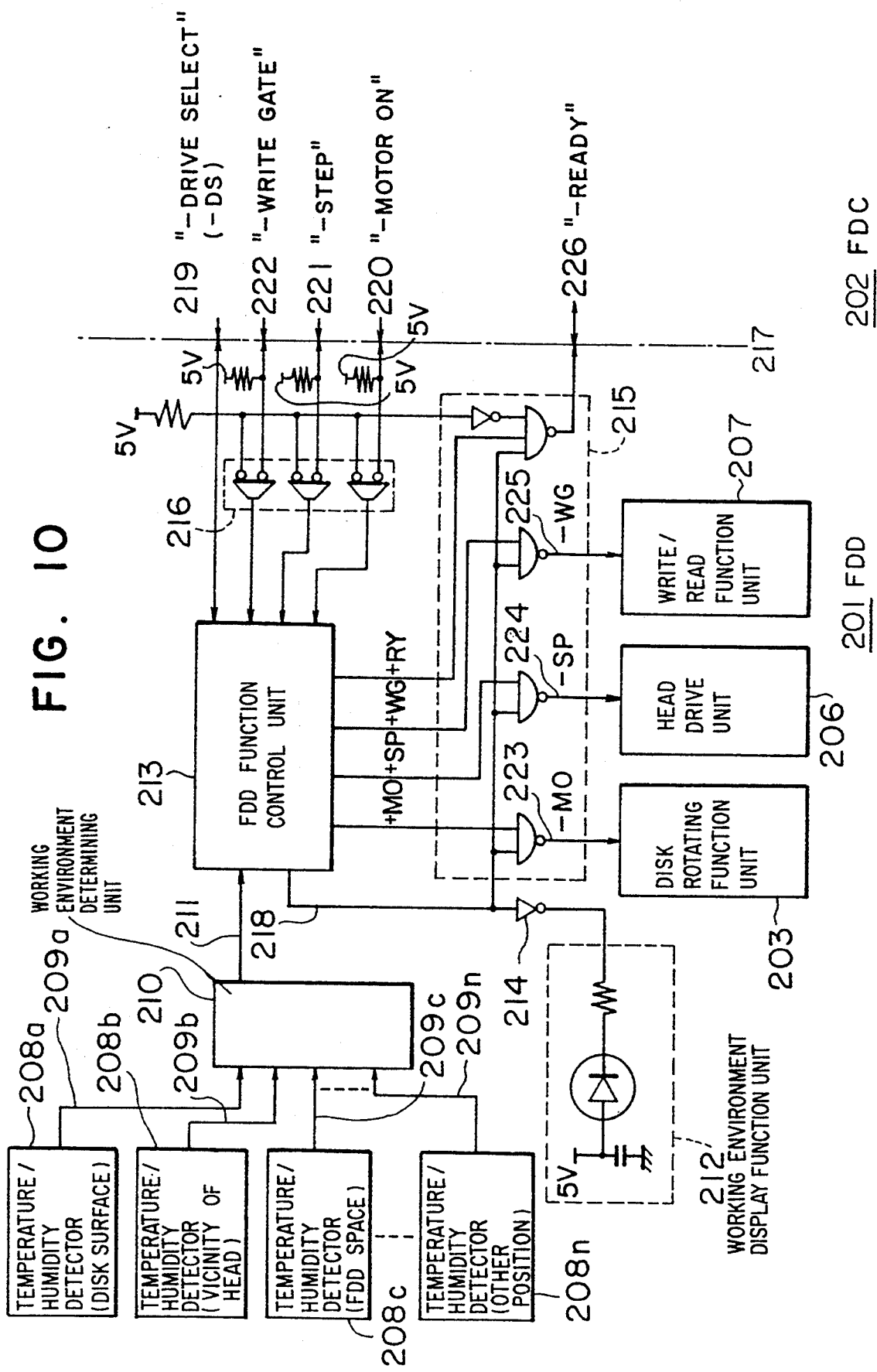
FIG. 10 is a schematic block diagram of the flexible disk device of FIG. 9.

FIGS. 9 and 10 show a flexible disk device according to the embodiment of the present invention. FIG. 9 is a schematic construction diagram, and FIG. 10 is a schematic block diagram of the device.

In FIGS. 9 and 10, reference numeral 201 denotes a flexible disk device (hereafter referred to as FDD), and 202 denotes a flexible disk controller (hereafter referred to as FDC) controlling driving function of the FDD 201. In the FDD 201, numeral 203 denotes a disk rotating function unit which mounts a flexible disk (hereafter referred to as FD) 205 as a recording medium inserted through a slot 204 and rotates it. Numeral 206 denotes a head drive unit for moving the head to a position where the head writes and reads data on and from FD 205, 207 denotes a write/read function unit having the head, and 208a, 208b, 208c . . . and 208n denote temperature/humidity detectors arranged at desired positions in the FDD 201. In the embodiment, the temperature/humidity detector 208a is located close to a surface of the FD 205, the temperature/humidity detector 208b is located in the vicinity of the head, the temperature/humidity detector 208c is located in the inner center position of the FDD 201, and so on, and the temperature/humidity detectors 108a to 108n generate detection output signals 209a to 209n, respectively. Numeral 210 denotes a working environment determining unit which determines whether the working environment is in an adequate condition or in an inadequate condition, and generates a determination output signal 211 based on detection output signals 209a, 209b, 209c . . . and 209n from the temperature/humidity detectors 208a, 208b, 208c . . . and 208n. Numeral 212 denotes a display function unit comprising an LED (light emitting diode) for displaying a condition of the working environment. Numeral 213 denotes FDD function control unit which controls the turn-on and -off of the working environment display function unit 212 by a determination output signal 211 through an amplifier 214. The FDD function control unit 213 controls the disk rotating function unit 203, the head drive unit 206, and the write/read function unit 207 through a control circuit 215. Also, the FDD function control unit 213 performs interface control of input and output signals with the FDC 202 through control circuits 215 and 216.

Figure 11:
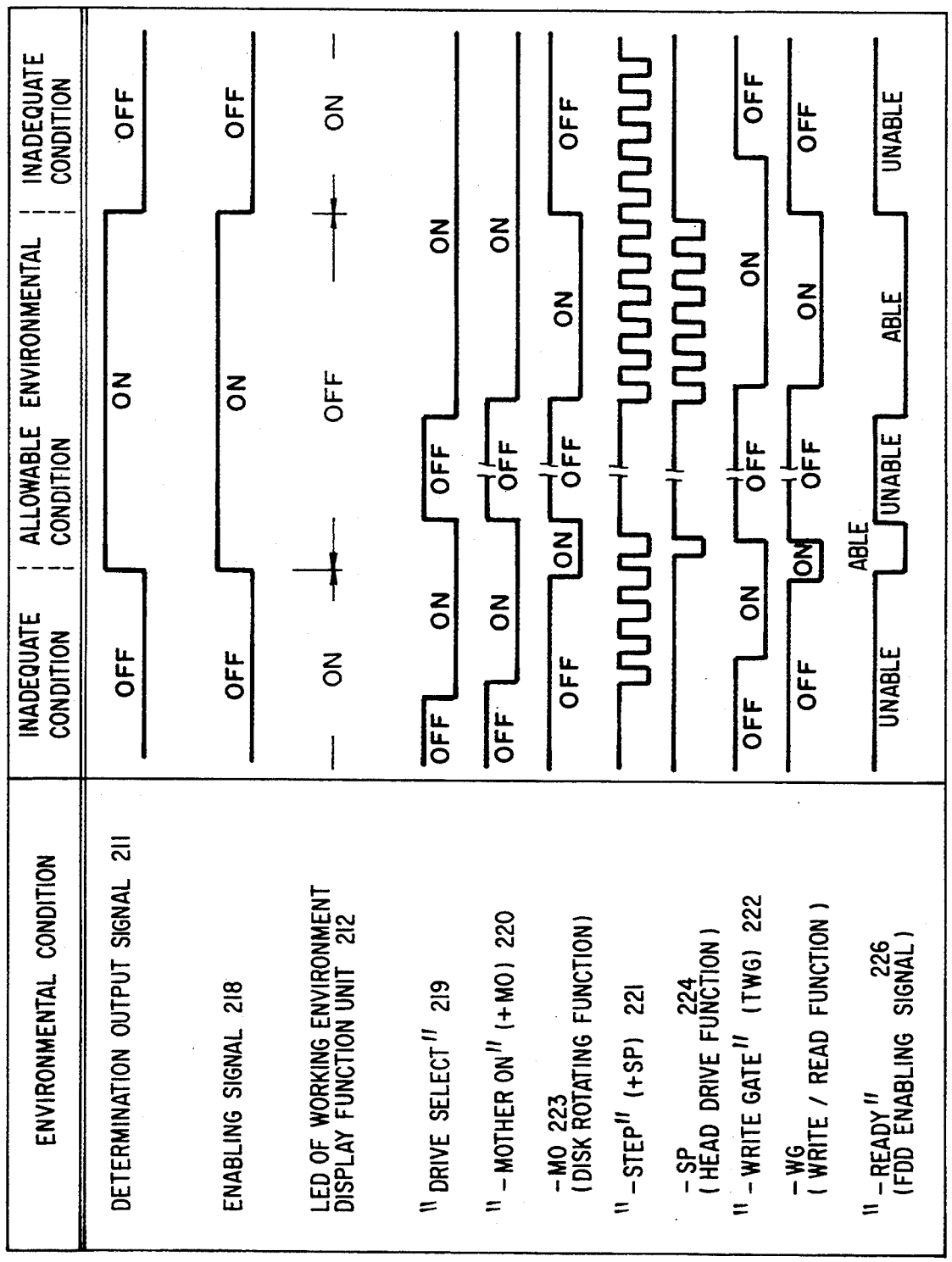
FIG. 11 is a timing chart for explaining the operation of the flexible disk device of FIG. 9.

The operation of the flexible disk device constructed as above will be described with reference to a timing chart shown in FIG. 11.

When the FDD 201 is used, the environmental temperature humidity conditions are detected at various positions, including the surface of the FD 205 mounted on the disk rotating function unit 203, the vicinity of the head, and the inner center position of the FDD 201. The working environment determining unit 210 collects detection output signals 209a, 209b, 209c . . . and 209n, determines whether the FDD 201 is in an allowable working environment or in an inadequate working environment, and outputs a determination output signal to the FDD function control unit 213. At this time, if any one of the temperature/humidity detectors 208a, 208b, 208c . . . and 208n detects that the working environment is inadequate, the working environment determining unit 210 determines the working environment to be inadequate, and the FDD function control unit 213, responding to this determination output signal, turns off an enabling signal 218, and lights the LED of the working environment display function unit 212, thereby notifying the user of the inadequate working environment and telling him not to use the FD but to wait.

On the other hand, the FDD function control unit 213 receives operation command signals, including Drive Select signal 219, Motor On (MO: disk rotating function) signal 220, Step (SP: head drive function) signal 221 and Write Gate (WG: write/read function) signal 222 among input and output signals 217 to be exchanged with the FDC 202. Since the above-mentioned enabling signal 218 is off, the control circuit 215 sets MO, SP and WG signals 223, 224 and 225 to the OFF levels for the disk rotating function unit 203, the head drive unit 206 and the write/read function unit 207 respectively, thereby putting those functions into the disabled states. At the same time, out of the input/output signals 217, the control circuit 215 sets the READY signal 226 to the OFF level to notify that the FDD 201 is in an inadequate working environment. According to this arrangement, it is possible to prevent the FDD 201 from being used in an inadequate working environment. The READY signal 226 to the FDC 202 may be used to control desired devices, thereby changing the ambient condition of the FD 205 into an allowable working environment. More specifically, the signal 226 may be fed back to quickly obtain an allowable working environment of the FDD 201 and the FD 205 by driving a cooling device when temperature or humidity is too high, or by driving a heating device or an air blower when temperature is too low. The entire environment of the place where a system including an FDD 201 is installed can be controlled to be in an allowable working condition.

In the meantime, as a result of detection by the temperature/humidity detectors 208a, 208b, 208c . . . and 208n, if the working environment determining unit 210 determines at the outset or in the course of time that the temperature and humidity are within the allowable ranges, the FDD function control unit 213 turns on the enabling signal 218 and extinguishes the LED of the working environment display function unit 212, thereby notifying the user that the working environment is in an adequate condition (it is possible to turn on a lamp of a different color from the color of the lamp indicative of inadequacy). As the enabling signal 218 has been on, the control circuit 215 sets the MO, SP and WG signals 223, 224 and 225 to the disk rotating function unit 203, the head drive unit 206, and the write/read function unit 207 respectively to the ON levels, and also sets the READY signal 226 to the FDC 202 to the ON level to notify that the working environment is in an adequate condition, so that the FDD 201 is made available.

According to the present invention which has been described, at least one of the temperature and the humidity of, for example, the surface of a flexible disk is detected by detecting unit, and the determining means determines whether the working environment is in an adequate or inadequate condition based on an output signal of the detecting unit. When the working environment is determined to be inadequate, the notifying means gives an indication of the result, and the disk rotating function, the head drive function and the write/read function are suspended. Under such an inadequate environment, even if the flexible disk controller issues operation commands, the above-mentioned functions are not activated based on an internal determination, so that the flexible disk may be protected from malfunction. Therefore, the prevention of misoperation results in improving the reliability and durability of the flexible disk. In addition, the flexible disk is prevented from being subjected to expansion or contraction, data are protected, and the magnetic characteristics of the flexible disk are prevented from deteriorating.

What is claimed is:

1. A removable flexible disk assembly comprising:
   an enclosure case having an aperture for head access;
   a disk disposed within said enclosure case, said aperture exposing said disk to the environment;
   an electrical detector means, supported by said enclosure case, for detecting a current environmental condition and for providing a detection signal which indicates said environmental condition;
   power reception means for receiving power to drive said detector means; and
   terminal means for transmitting said detection signal outside of said assembly.

2. A removable flexible disk assembly according to claim 1,
   wherein said current environmental condition comprises at least one of temperature and humidity in said enclosure case.

3. A removable flexible disk assembly according to claim 1,
   further comprising means for determining whether the current environmental condition is in a predetermined acceptable range for operation in a flexible disk device and for outputting a second signal representing whether said current environmental condition is in said predetermined acceptable range, said detection signal and said second signal being provided to the flexible disk device for controlling the flexible disk device.

4. A removable flexible disk assembly according to claim 1, further comprising a display means for indicating whether the current environmental condition falls within a predetermined acceptable range for operation.

5. A removable flexible disk assembly according to claim 4, further comprising a second terminal means for receiving reference information from outside of the assembly and transferring the reference information to the detector means.

6. A removable flexible disk assembly according to claim 1, wherein said detector means comprises a capacitor, said capacitor comprising dielectric means for changing a capacitance of said capacitor in response to said current environmental condition.

7. A removable flexible disk assembly according to claim 6, wherein said dielectric means comprises a moisture-sensitive polymer.

8. A removable flexible disk assembly according to claim 7, wherein said capacitor further comprises first and second electrodes on a first side of said moisture-sensitive polymer and a third electrode on a second side of said moisture-sensitive polymer.

9. A removable flexible disk assembly according to claim 1, wherein said detector means comprises a thermistor.

10. A removable flexible disk assembly according to claim 1, wherein said detector means comprises a thermocouple.

11. A removable flexible disk assembly according to claim 1, wherein said detector means is positioned within said enclosure case.

12. A removable flexible disk assembly according to claim 1, wherein said current environmental condition comprises said temperature in said enclosure case.

* * * * *